United States Patent
Li et al.

(10) Patent No.: US 11,669,679 B2
(45) Date of Patent: Jun. 6, 2023

(54) TEXT SEQUENCE GENERATING METHOD AND APPARATUS, DEVICE AND MEDIUM

(71) Applicant: Beijing Bytedance Network Technology Co., Ltd., Beijing (CN)

(72) Inventors: Hang Li, Beijing (CN); Chao Qiao, Beijing (CN); Hayate Iso, Beijing (CN)

(73) Assignee: Beijing Byledance Network Technology Co., Ltd., Beijing (CN)

(*) Notice: Subject to any disclaimer, the term of this patent is extended or adjusted under 35 U.S.C. 154(b) by 0 days.

(21) Appl. No.: 17/819,550

(22) Filed: Aug. 12, 2022

(65) Prior Publication Data

US 2022/0382965 A1 Dec. 1, 2022

Related U.S. Application Data

(63) Continuation of application No. PCT/CN2021/101267, filed on Jun. 21, 2021.

(30) Foreign Application Priority Data

Jun. 24, 2020 (CN) .......... 202010591970.9

(51) Int. Cl.
- *G06F 40/166* (2020.01)
- *G06F 16/35* (2019.01)
- *G06F 40/103* (2020.01)

(52) U.S. Cl.
CPC .......... *G06F 40/166* (2020.01); *G06F 16/355* (2019.01); *G06F 40/103* (2020.01)

(58) Field of Classification Search
CPC .................................................. G06F 40/166
See application file for complete search history.

(56) References Cited

U.S. PATENT DOCUMENTS

| | | | | |
|---|---|---|---|---|
| 2003/0112583 | A1* | 6/2003 | Kim | ........................ G10L 15/00 |
| 2010/0161385 | A1* | 6/2010 | Karypis et al. | ........ G06Q 10/00 |
| 2013/0238316 | A1* | 9/2013 | Shastri et al. | .......... G06F 17/21 |
| 2016/0350280 | A1 | 12/2016 | Lavallee et al. | |
| 2017/0300477 | A1 | 10/2017 | Long et al. | |

(Continued)

FOREIGN PATENT DOCUMENTS

| | | |
|---|---|---|
| CN | 107526725 A | 12/2017 |
| CN | 108268613 A | 7/2018 |
| CN | 109062937 A | 12/2018 |

(Continued)

OTHER PUBLICATIONS

Ankur P. Parikh et al., ToTTo: A Controlled Table-To-Text Generation Dataset, arXiv:2004.14373v1 [cs.CL], Apr. 29, 2020.

(Continued)

*Primary Examiner* — James J Debrow
(74) *Attorney, Agent, or Firm* — Arentfox Schiff LLP

(57) ABSTRACT

Embodiments of the present disclosure disclose a text sequence generating method and apparatus, a device and a medium. The method includes: obtaining an initial text sequence, extracting an initial text feature from the initial text sequence; obtaining a structured text sequence, and extracting a structured feature from the structured text sequence, where the structured text sequence is associated with a fact in the initial text sequence; and fusing and generating a target text sequence based on the initial text feature and the structured feature.

16 Claims, 5 Drawing Sheets

(56) References Cited

U.S. PATENT DOCUMENTS

2020/0097554 A1  3/2020  Rezagholizadeh et al.

FOREIGN PATENT DOCUMENTS

| | | |
|---|---|---|
| CN | 109643315 A | 4/2019 |
| CN | 110023926 A | 7/2019 |
| CN | 110362823 A | 10/2019 |
| CN | 110377902 A | 10/2019 |
| CN | 110413977 A | 11/2019 |
| CN | 110737758 A | 1/2020 |
| CN | 111177383 A | 5/2020 |
| CN | 111783422 A | 10/2020 |
| EP | 1672531 A2 | 6/2006 |
| JP | 2004287683 A | 10/2004 |
| WO | 2018019289 A1 | 2/2018 |

OTHER PUBLICATIONS

Notification to Grant Patent Right for Invention in corresponding Chinese Patent Application No. 202010591970.9, , dated Jan. 21, 2022.

First Office Action in corresponding Chinese Patent Application No. 202010591970.9, dated Jul. 9, 2021.

Second Office Action in corresponding Chinese Patent Application No. 202010591970 9, dated Sep. 15, 2021.

Third Office Action in corresponding Chinese Patent Application No. 202010591970.9, dated Nov. 18, 2021.

Hyeseon Ko et al., Diversity Regularized Autoencoders for Text Generation, in the 35th ACM/SIGAPP Symposium on Applied Computing (SAC '20), Association for Computing Machinery, Mar. 30, 2020, Brno, Czech Republic, pp. 883-891.

Xudong Hong et al, Improving Language Generation from Feature-Rich Tree-Structured Data with Relational Graph Convolutional Encoders, in Proceedings of the 2nd Workshop on Multilingual Surface Realisation (MSR 2019), Oct. 2019, pp. 75-80, Hong Kong, China. Association for Computational Linguistics.

International Search Report and Written Opinion from corresponding International Patent Application PCT/CN2021/101267, dated Sep. 27, 2021.

Josep Valls et al., Natural Language Generation through Case-Based Text Modification, Case-Based Reasoning Research and Development, 20th International Conference, ICCBR 2012, Lyon, France, Sep. 3-6, 2012, pp. 443-457.

Remi Lebret et al., Neural Text Generation from Structured Data with Application to the Biography Domain, in Proceedings of the 2016 Conference on Empirical Methods in Natural Language Processing, pp. 1203-1213, Austin, Texas. Association for Computational Linguistics. arXiv:1603.07771v3 [cs:CL] Sep. 23, 2016.

Cao Juan et al., Research on Neural Network Model of Data-of-text Generation, Computer Technology and Development, vol. 29, No. 9, Sep. 2019, pp. 7-12, and 23. Abstract on p. 1.

* cited by examiner

TEXT SEQUENCE GENERATING METHOD AND APPARATUS, DEVICE AND MEDIUM

CROSS-REFERENCE TO RELATED APPLICATIONS

This application is a continuation application of International Application No. PCT/CN2021/101267, filed on Jun. 21, 2021, which claims priority to Chinese patent application No. 202010591970.9, filed on Jun. 24, 2020. Both of the aforementioned applications are hereby incorporated by reference in their entireties.

TECHNICAL FIELD

Embodiments of the present disclosure relate to the field of artificial intelligence, and in particular, to a text sequence generating method and apparatus, a device and a medium.

BACKGROUND

With a popularity of informational application software, a large amount of informational data needs to be processed and provided to users. The informational data can be presented in various forms, such as texts, pictures and videos. An article generated based on the text is an important form of informational presentation.

Due to a large amount of the articles are going to be processed, various automatic text conversion technologies have been used to generate or convert the article, so as to convert original text material into text articles that meet current needs. When the technology is used for a conversation between different languages or between different text forms, it can be a machine translation; and when the technology is used for the conversation between articles and abstracts, it can be an automatic article summarization.

SUMMARY

Embodiments of the present disclosure provide a text sequence generating method and apparatus, a device and a medium, so as to optimize a generating method for a text article, which is taken as a text sequence, and improve an accuracy and fluency of text articles.

In a first aspect, an embodiment of the present disclosure provides a text sequence generating method, including:

obtaining an initial text sequence, and extracting an initial text feature from the initial text sequence;

obtaining a structured text sequence, and extracting a structured feature from the structured text sequence; where the structured text sequence is associated with a fact in the initial text sequence; and fusing and generating a target text sequence based on the initial text feature and the structured feature.

In a second aspect, an embodiment of the present disclosure further provides a text sequence generating apparatus, including:

an initial text feature extracting module, configured to extract an initial text feature of an initial text sequence;

a structured feature extracting module, configured to extract a structured feature of a structured text sequence; and a fusing module, configured to fuse and generate a target text sequence according to the initial text feature and the structured feature.

In a third aspect, an embodiment of the present disclosure further provides an electronic device, including:

one or more processors;

a memory for storing one or more programs;

when the one or more programs are executed by the one or more processors, enables the one or more processors to implement the text sequence generating method provided by any embodiment of the present disclosure.

In a fourth aspect, an embodiment of the present disclosure further provides a non-transitory computer-readable storage medium, on which a computer program is stored, and when a processor executes the computer program, the text sequence generating method provided by any embodiment of the present disclosure is implemented.

In a fifth aspect, an embodiment of the present disclosure further provides a computer program product, including a computer program, and when a processor executes the computer program, the text sequence generating method provided by any embodiment of the present disclosure is implemented.

In a sixth aspect, an embodiment of the present disclosure further provides a computer program, when a processor executes the computer program, the text sequence generating method provided by any embodiment of the present disclosure is implemented.

BRIEF DESCRIPTION OF DRAWINGS

The above and other features, advantages and aspects of various embodiments of the present disclosure will become more apparent when taken in conjunction with accompanying drawings and with reference to the following detailed embodiments. Throughout the accompanying drawings, the same or similar reference numbers refer to the same or similar elements. It should be understood that the accompanying drawings are schematic and components and elements are not necessarily drawn to scale.

DESCRIPTION

Figure 1:
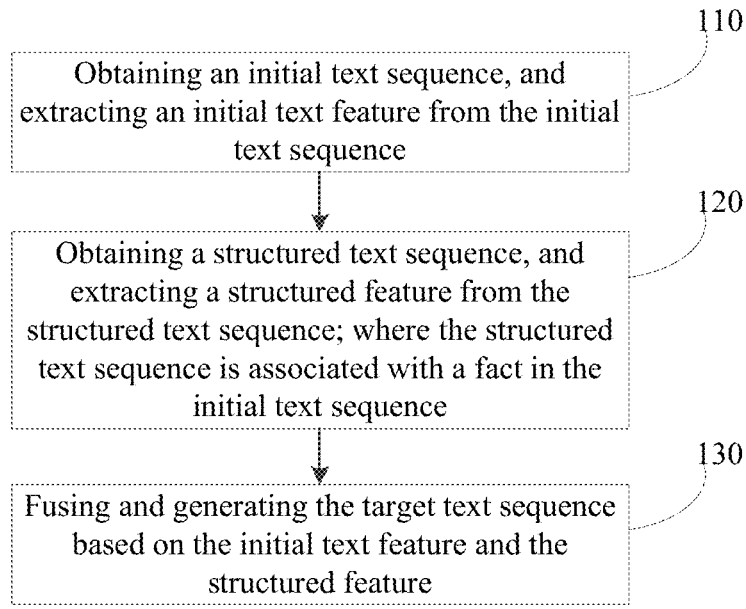
FIG. 1 is a flowchart of a text sequence generating method provided by one or more embodiments of the present disclosure.

Embodiments of the present disclosure will be described in more detail below with reference to accompanying drawings. Even though certain embodiments of the present disclosure are shown in the accompanying drawings, it should be understood that the present disclosure may be implemented in various forms and should not be construed as limited to the embodiments set forth herein, but rather the provided embodiments are for a purpose of a more thorough and complete understanding of the present disclosure. It should be understood that the accompanying drawings and embodiments of the present disclosure are only for exemplary purposes, and are not intended to limit a protection scope of the present disclosure.

It should be understood that various steps described in method embodiments of the present disclosure may be performed in different orders and/or in parallel. Furthermore, the method embodiments may include additional steps and/or illustrated steps that are omitted to perform. A scope of the present disclosure is not limited herein.

As used herein, a term "including" and variations thereof are open-ended inclusions, i.e., "including but not limited to"; the term "based on" is "based at least in part on"; the term "one embodiment" means "at least one embodiment"; the term "another embodiment" means "at least one additional embodiment"; the term "some embodiments" means "at least some embodiments". Relevant definitions of other terms will be given in the description below.

It should be noted that concepts such as "first" and "second" mentioned in the present disclosure are only used to distinguish different apparatus, modules or units, and are not used to limit an order of functions performed by these apparatus, modules or units, or interdependence of thereto.

It should be noted that modifications of "a" and "a plurality" mentioned in the present disclosure are illustrative rather than restrictive, and those skilled in the art should understand that they should be understood as "one or a plurality of" unless the context clearly indicates otherwise.

Names of messages or information exchanged between multiple apparatus in the embodiments of the present disclosure are only for illustrative purposes, and are not intended to limit the scope of these messages or information.

In related technologies, automatic text conversion technology or table-to-text conversion technology is generally used, in which, the automatic text conversion technology usually converts languages of different languages or converts specific text formats, such as, converting Chinese texts into English texts, or converting articles into abstracts. The table-to-text conversion technology is based on an informational table of structured data, after setting a relationship between each row, column, and table frame, setting certain punctuation marks where needed, and removing the table frame, a table frame content with punctuation marks is obtained, which is equivalent to listing the content of the table frame with caret. The above two technical solutions cannot edit a text for text content, and cannot correct accuracy and fluency of the text content, resulting in factual errors and disordered vocabulary order in the converted text used by the user.

Technical solutions of the embodiments of the present disclosure provide a text sequence generating method, which can be applied to various informational editing systems. The text sequence generating method can be applied to a text editing system, and the text editing system includes one or more storage areas. Among them, the one or more storage areas fuse sequences through an algorithm. By filtering different types of sequences with factual associations after matching, the filtered sequences are fused to generate a new sequence. Among them, the one or more storage areas of the text editing system can be implemented by various personal computers, notebook computers, smart phones, tablet computers and portable wearable devices, servers and/or server clusters composed of multiple servers.

FIG. 1 is a flowchart of a text sequence generating method provided by one or more embodiments of the present disclosure, the method can be applied to various text editing scenarios, and generate a new text sequence based on an existing text sequence. The method is performed by a text sequence generating apparatus, which may be implemented in software and/or hardware, and may be specifically inherited to an electronic device with storage and computing capabilities for text processing.

As shown in FIG. 1, a text sequence generating method is provided, including:

Step 110, obtaining an initial text sequence, and extracting an initial text feature from the initial text sequence;

the initial text sequence is an existing text sequence, which is equivalent to a source text sequence and is a material used to generate a new target text sequence. The initial text sequence can be an independent sentence including several or more than a dozen vocabularies, or it can be an entire article including multiple independent sentences. Each element in a sequence corresponds to a vocabulary.

The initial text feature extracted from the initial text sequence is a feature sequence that can characterize features of each vocabulary, and the initial text feature may be a vocabulary sequence or a vector of an encoded value corresponding to the vocabulary. There are many ways to extract the initial text features. For example, the initial text sequence can be input into a bi-directional long short-term memory recurrent neural network to extract the initial text features.

In which, the initial text sequence is the vector of the vocabulary coded value in at least one initial text, and the initial text features can be extracted by inputting the initial text sequence into the bi-directional long short-term memory recurrent neural network, which is a method for extracting the initial text feature. Exemplarily, the inputting the initial text sequence into the bi-directional long short-term memory recurrent neural network may be to classify the initial text sequence through the bi-directional long short-term memory recurrent neural network, generate relevant feature parameters of each category, and obtain the initial text feature.

Step 120, obtaining a structured text sequence, and extracting a structured feature from the structured text sequence; where the structured text sequence is associated with a fact in the initial text sequence;

the structured text sequence is an existing fact text sequence, which is equivalent to a factual source text sequence, and is used to compare and correct the initial text sequence. The structured text sequence is structured data, which can be a single cell including several or more than a dozen vocabularies, or a complete table including multiple cells. Each of the element in the sequence corresponds to a vocabulary.

The structured feature extracted from the structured text sequence is a feature sequence capable of representing the fact, and the structured feature may be a vocabulary sequence or the vector of the encoded value corresponding to the vocabulary.

In which, the structured text sequence is associated with the fact in the initial text sequence refers to the structured text sequence is associated with factual content of the initial text sequence, such as all fact-structured vocabularies in the initial text sequence through a vocabulary retrieve, where all the retrieved factual structured vocabularies are associated with the initial text sequence in substance.

Specifically, there are many ways to extract the structured feature. For example, at least one factual triplet can be determined from the structured text sequence, and then multiple semantically spliced factual triples can be input into a fully connected neural network, to extract the structured feature of the structured text sequence. In essence, a plurality of the factual triplets are spliced to obtain an overall factual triplet sequence of the structured text sequence, and the structured feature is obtained through classification and hierarchical association by the fully connected neural network.

The obtaining the structured text sequence, and extracting the structured feature from the structured text sequence may specifically be: determining at least one factual triplet based on the structured text sequence, where the factual triplet includes a subject, a predicate and an object; inputting the factual triplets into the fully connected neural network to splice and form a factual triplet sequence, which is taking as the structured feature.

The at least one factual triplet is determined based on the structured text sequence is, for example, when the structured text sequence is a table, the factual triplet of the table is determined, a key vocabulary of the table is determined as a first element, a column of the table is determined as a second element, content corresponding to the column of the table is determined as a third element, multiple factual triplets of this table is determined in this way, the subject, predicate and object in the factual triplet is spliced and input into the fully connected neural network to form the factual triplet sequence, which is taking as the structured feature.

For example, the structured text sequence is shown in the following table:

| Classification | Name | Height | Ancestral home | Birthplace | Sport event | Former team |
|---|---|---|---|---|---|---|
| Character | YAO Ming | 2.26 m | Jiangsu | Shanghai | Basketball | Shanghai Sharks, Houston Rockets |

Then the factual triplet extracted from the structured text sequence is, for example, <YAO Ming, birthplace, Shanghai>. Multiple factual triplets can be similarly extracted and spliced to form the structured features of this informational table.

Step 130, fusing and generating the target text sequence based on the initial text feature and the structured feature.

In which, the fusing and generating the target text sequence based on the initial text feature and the structured feature, may be fusing the initial text sequence with the structured text sequence to generate the target text sequence through using the initial text feature and the structured feature.

In which, the fusing the initial text sequence with the structured text sequence to generate the target text sequence through using the initial text feature and the structured feature, may be determining a target text feature based on the structured feature and the initial text feature, so as to generate the target text sequence based on the target text feature.

In the above-mentioned text sequence generating method, a fusion technology of the initial text sequence and the structured text sequence is used to achieve the fusion of different types of text sequences associated with the fact, which solves a problem of factual errors or omissions in the text-to-text conversion technology, as well as technical problems about the text obtained by the table-to-text conversion technology are blunt and unsmooth, and improves the accuracy and fluency of the text editing.

Figure 2A:
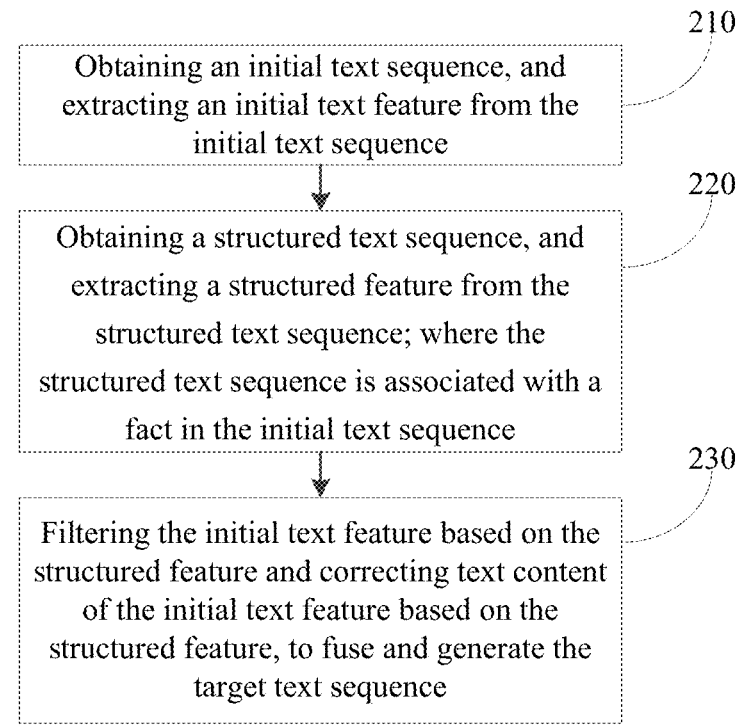
FIG. 2A is a flowchart of a text sequence generating method provided by one or more embodiments of the present disclosure.

FIG. 2A is a flowchart of a text sequence generating method provided by one or more embodiments of the present disclosure. A technical solution of this embodiment is further refined on the basis of the above-mentioned technical solution, and specifically mainly includes the following steps:

Step 210, obtaining an initial text sequence, and extracting an initial text feature from the initial text sequence;

Step 220, obtaining a structured text sequence, and extracting a structured feature from the structured text sequence; where the structured text sequence is associated with a fact in the initial text sequence;

Step 230, filtering the initial text feature based on the structured feature and correcting text content of the initial text feature based on the structured feature, to fuse and generate the target text sequence;

the fact reflected in the structured text sequence are generally more accurate and refined, while a factual expression in the initial text sequence may be inaccurate and there are various redundant information. Therefore, the initial text feature can be filtered and the text content thereof can be corrected by using the structured feature, whereby the two contents are fused to generate the target text sequence.

Figure 2B:
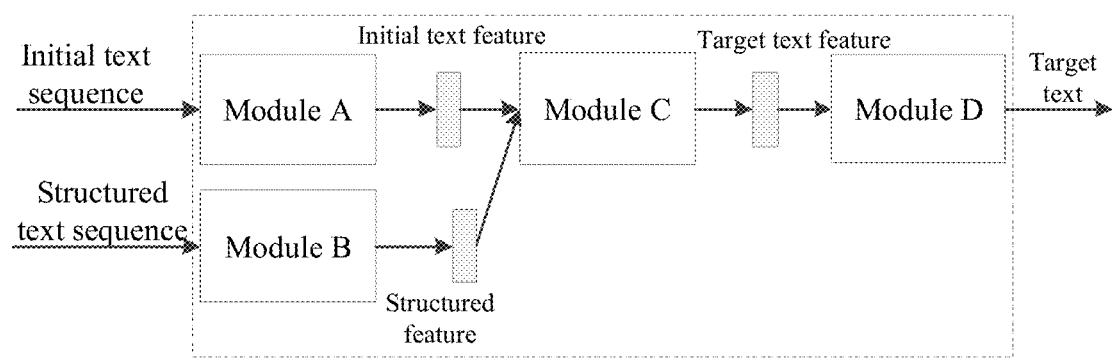
FIG. 2B is a schematic structural diagram of a text sequence generating method provided by one or more embodiments of the present disclosure.

A process of fusing and generating the target text sequence can be implemented in many ways, specifically:

as shown in FIG. 2B, a first draft of an article can be used as the initial text sequence, and input it into a module A capable of extracting the initial text feature for processing, to generate the initial text feature, which can be used as a representation of the first draft of the article; an informational table is input as the structured text sequence into a module B for processing, to generate the structured feature, which can be used as the representation of the informational table; then the initial text feature and structured feature are spliced in a module C to form a combined vectorized feature, which can be used as an identification of the article, that is, before the fusing and generating the target text sequence based on the initial text feature and the structured feature, further including: inputting the initial text feature and the structured feature into a fully connected neural network to perform a feature splicing to generate the target text feature; and then inputting the spliced target text feature into a module D to generate the target text sequence, which is taking as a target article. The above modules can be implemented by a neural network as a deep learning model, so as to construct a text conversion model that converts an overall about the initial text sequence with the structured text sequence to the target text sequence. Data samples such as a large amount of triples like <the first draft of the article, the article, the informational table> can be used to train the text conversion model, and the text conversion model is learned and updated by stochastic gradient descent and back propagation.

Figure 2C:
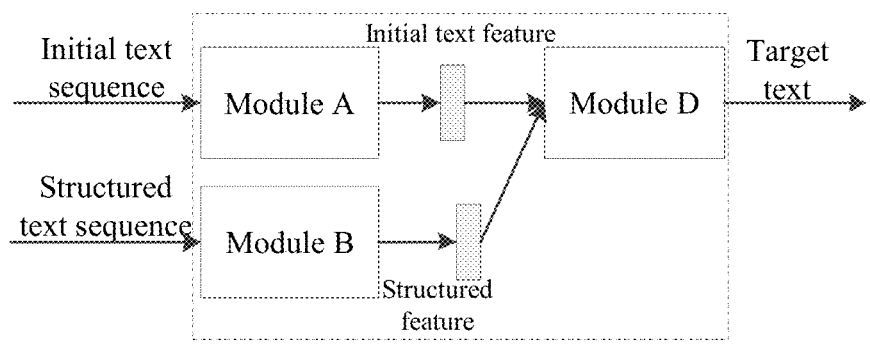
FIG. 2C is a schematic structural diagram of a text sequence generating method provided by one or more embodiments of the present disclosure.

Alternatively, as shown in FIG. 2C, the first draft of the article can be used as the initial text sequence, and inputting it into the module A capable of extracting the initial text feature for processing, to generate the initial text feature, which can be used as the representation of the first draft of the article; the informational table is input as the structured text sequence into the module B for processing, to generate the structured feature, which can be used as the representation of the informational table; then the initial text feature and structured feature are input into module D respectively to generate the target text sequence, which is taking as the target article. The above modules can be implemented by a neural network as a deep learning model, so as to construct a text conversion model that converts an overall about the initial text sequence with the structured text sequence to the target text sequence. Data samples such as a large amount of triples like <the first draft of the article, the article, the informational table> can be used to train the text conversion model.

The technical solutions of the embodiments of the present disclosure can edit existing text sequences without directly generating the target article from a structured information table, and only a small amount of data samples are needed to train and build the text conversion model, which is easier to implement, and a factual expression of the converted target article is more accurate, the text thereto is more fluent and natural.

Figure 3:
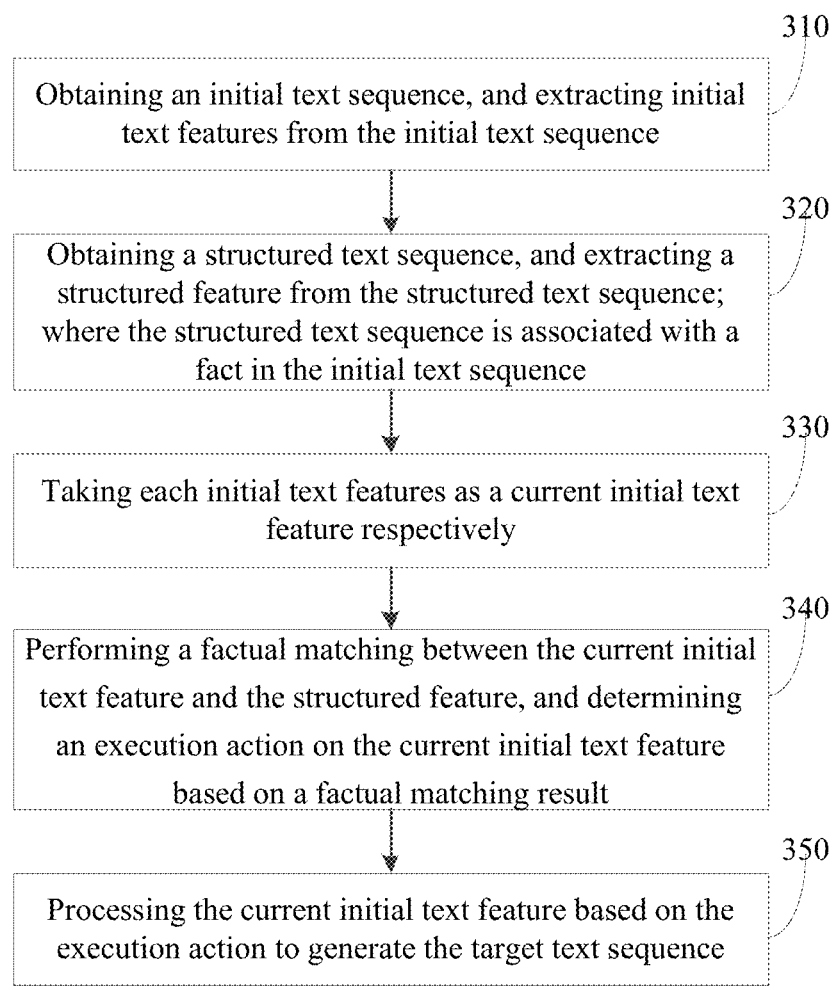
FIG. 3 is a flowchart of a text sequence generating method provided by one or more embodiments of the present disclosure.

FIG. 3 is a flowchart of a text sequence generating method provided by one or more embodiments of the present disclosure. This embodiment further introduces an implementation of fusing and generating a target text sequence based on the initial text feature and the structured feature on the basis of the above-mentioned embodiments. The method includes:

Step 310, obtaining an initial text sequence, and extracting initial text features from the initial text sequence;

Step 320, obtaining a structured text sequence, and extracting a structured feature from the structured text sequence; where the structured text sequence is associated with a fact in the initial text sequence;

Step 330, taking each of the initial text features as a current initial text feature respectively;

this embodiment can process the sequenced initial text feature one by one. For example, an existing article actually includes multiple initial text sequences in sequence, and the initial text features of each initial text sequence can be processed one by one as the current initial text features.

Step 340, performing a factual matching between the current initial text feature and the structured feature, and determining an execution action on the current initial text feature based on a factual matching result;

taking an article as an example, the article may include descriptions of facts or other auxiliary descriptions, and the target text sequence converted in this embodiment mainly needs to include factual description texts, thus non-factual description texts can be filtered. A specific filtering method may be to perform the factual matching between the current initial text feature and each structured feature, and filter out the initial text feature that is non-factually described with the fact in the structured feature. A filtering operation is implemented by determining different execution actions.

The operation of the factual matching in step 340 may specifically be: inputting the current initial text feature and the structured feature into a long short-term memory recurrent neural network for the factual matching, and determining the execution action for the current initial text feature based on the factual matching result. This operation is equivalent to traversing and matching the current initial text feature in each structured feature.

Step 350: processing the current initial text feature based on the execution action to generate the target text sequence.

The specific execution action can be used to implement the filtering for non-factual description text features and a correction for factual text features, and preferably, the execution actions can include discarding, reserving and generating.

In this embodiment of the present disclosure, the following operations are, in an embodiment, performed to determine the execution action for the current initial text feature and a corresponding execution manner based on the factual matching result:

when there is a structured feature that matches the current initial text feature, and the current initial text feature matches text content of the matched structured feature, determining that then the execution action is reserving;

when there is the structured feature that matches the current initial text feature, and the current initial text feature is inconsistent with the text content of the matched structured feature, then determining that the execution action is splicing and generating;

when there is no structured feature matching the current initial text feature, then determining that the execution action is discarding;

correspondingly, the processing the current initial text feature based on the execution action to generate the target text sequence includes:

if the execution action is reserving, then reserving the current initial text feature as the target text feature;

if the execution action is splicing and generating, then splicing and generating the target text feature based on the current initial text feature and the matched structured feature;

if the execution action is discarding, then filtering and discarding the current initial text feature;

generating the target text sequence based on the target text feature.

The non-factual description text can be discarded by performing corresponding actions on the initial text features, or the factual description text can be reserved, or a more fluent target text sequence can be generated based on the initial text feature and matched structured feature. Moreover, the target text feature can be generated first by performing the action, and the target text sequence can be recovered and generated according to the target text sequence.

A technical solution of the embodiments of the present disclosure can use different execution actions for each initial text sequence to perform the filtering, correction and fusing on the initial text sequence based on the structured text sequence, so as to generate the target text sequence with accurate factual descriptions as well as natural and smooth expressions.

One or more embodiments of the present disclosure provide a text sequence generating method. This embodiment further introduces a specific implementation of the text sequence generating method on the basis of the above-mentioned embodiments. The method includes:

obtaining an initial text sequence, and extracting initial text features from the initial text sequence;

obtaining a structured text sequence, and extracting the structured feature from the structured text sequence; where the structured text sequence is associated with a fact in the initial text sequence;

taking each of the initial text features as a current initial text feature respectively;

performing a factual matching between the current initial text feature and the structured feature, and determining an execution action for the current initial text feature based on a factual matching result;

where the performing the factual matching between the current initial text feature and the structured feature, and determining an execution action for the current initial text feature based on a factual matching result, a specific algorithm implementation of the determining an execution action for the current initial text sequence based on the factual matching result is as follows:

calculating a current factual vector $\tilde{t}_t$ based on the following formula:

$$\tilde{t}_t = \sum_{j=1}^{M} \alpha_{t,j} t_j \quad \text{Formula (1)}$$

in which, $\alpha_{t,j}$ is determined based on the following formula:

$$\alpha_{t,j} \propto \exp(v_\alpha^T \cdot \tanh(W_\alpha \cdot [s_t; b_t; t_j])) \quad \text{Formula (2)}$$

in which, the $W_\alpha$ and $v_\alpha^T$ are parameters to be trained, and the parameters to be trained of a model can be determined by learning in a training process according to the above-mentioned text conversion model; $b_t$ is the current initial text feature; $s_t$ is a current target text feature; a subscript t is a serial number of the text feature; $t_j$ is the structured feature, $1 \leq j \leq M$, and M is the number of the structured features; exp( ) is a exponential function, and tanh( ) is a hyperbolic tangent function;

in which, $t_j$ can be determined based on the following formula:

$$t_j = \tanh(W_t \cdot [e_j^{rabj}; e_j^{pred}; e_j^{abj}] + \alpha_t) \quad \text{Formula (3)}$$

in which, $W_t$ and $\alpha_t$ are parameters to be trained; $e_j^{rabj}$, $e_j^{pred}$ and $e_j^{abj}$ are semantic vocabulary vectors of the subject, predicate and object of the structured feature; where [;] represents a connection of the vector;

inputting $b_t$, $s_t$ and $t_t$ into a fully connected neural network to obtain an action selection judging vector $z_t$ based on the following formula:

$$z_t = \tanh(W_z \cdot [s_t; b_t; \tilde{t}_t] + \alpha_z) \quad \text{Formula (4)}$$

in which, $W_z$ and $\alpha_z$ are parameters to be trained.

The above formula (1) specifically takes the current initial text feature $b_t$ and the current target text feature $s_t$ at a current moment as a query, and uses all the structured features $t_j$ as a key value, and uses an attention mechanism to calculate the factual vector $\tilde{t}_t$ at the current moment.

Determining, based on a multiplication result of the action selection judgment vector $z_t$ and an action selection parameter $W_a$, an action determining probability p(action|$z_t$) of an action performed on the current initial text feature;

in which, $W_a$ is the parameter to be trained, and there are three preset actions: discarding, reserving and generating.

Determining the execution action of the current initial text sequence based on the action determining probability.

The current initial text feature is processed based on the execution action to generate the target text sequence.

That is, the text conversion model completes a traversal operation for the structured features through a time series long short-term memory recurrent neural network. At each moment, the model can perform one of three execution actions of reserving, discarding and generating.

For the execution actions of discarding, reserving and generating, the discarding can be to discard the current initial text feature and no longer incorporate it into the target text feature; the reserving can be to reserve the current initial text feature and directly use it as the target text feature; an operation of the generating is more complex and needs to correct the current initial text features based on the structured features. The generating actions are described in detail as follows:

in an embodiment, the splicing and generating the target text feature based on the current initial text feature and the matched structured feature includes:

taking vocabularies in a vocabulary base and vocabularies in the structured text sequence as a candidate vocabulary, calculating a generating probability about each candidate vocabulary as a new vocabulary, and determining the new vocabulary based on the generating probability; and mapping the new vocabulary and to generate a sequence vector and splicing it with the current factual vector $\tilde{t}_t$ to generate the target text feature.

The above technical solution specifically is to jointly select, based on the vocabulary in the original structured text sequence and other vocabulary in the additional vocabulary base, which new vocabulary is generated to generate the target text sequence. The vocabulary base includes a large amount of available vocabularies, not limited to the vocabulary in the structured text sequence and the initial text sequence.

The vector representing the new vocabulary can be mapped by a projection matrix $W_p$ to generate a sequence vector as the text feature representing the new vocabulary. The projection matrix $W_p$ is also used as a parameter to be trained for the model.

In the above process, in an embodiment, the taking the vocabulary in the vocabulary base and the vocabulary in the structured text sequence as the candidate vocabulary, calculating the generating probability of each candidate vocabulary being the new vocabulary, and determining the new vocabulary based on the generating probability includes:

calculating a source probability $p_{gate}$ that a source of the new vocabulary is the vocabulary base or structured text sequence based on the following formula:

$$p_{gate} = \text{sigmoid}((\omega_g^T \cdot z_t + a_g)) \quad \text{Formula (5)}$$

in which, $\omega_g^T$ and $a_g$ are parameters to be trained; sigmoid( ) is an activation function;

calculating a generating probability $p_{gen}(y_t|z_t)$ of the candidate vocabulary in the vocabulary based on the following formula:

$$p_{gen}(y_t|z_t) = \text{softmax}(W_y \cdot z_t) \quad \text{Formula (6)}$$

in which, $W_y$ is a parameter to be trained, $y_t$ is a new vocabulary to be generated; softmax( ) is a cost function of a regression algorithm;

calculating a copy probability $p_{copy}$ of the candidate vocabulary in the structured text sequence based on the following formula:

$$p_{copy} = (o_j|z_t) \propto \exp(v_c \cdot \tanh(W_c \cdot [z_t; t_j])) \quad \text{Formula (7)}$$

in which, $v_c$ and $W_c$ are parameters to be trained, and $o_j$ is a factual triplet of the candidate vocabulary;

calculating, based on the source probability, the generating probability and the copy probability, the generating probability of the new vocabulary as:

$$p(y_t|z_t)=p_{gate}p_{gen}(y_t|z_t)+1-p_{gate})\Sigma_{j=1:o_j=y_t}^{M}p_{copy}(o_j|z_t) \quad \text{Formula (8)}$$

determining the new vocabulary from each candidate vocabulary based on the generating probability.

In the above probability calculation process, the source probability is first calculated, that is, the probability that the brand new vocabulary should be generated from the vocabulary base or the vocabulary should be copied from the structured text sequence. The generating probability expresses the probability that the candidate vocabulary is selected from the vocabulary base, and the copy probability expresses the probability that the candidate vocabulary is selected from the structured text sequence. Finally, the total generating probability is calculated.

One or more embodiments of the present disclosure provide a text sequence generating method. This embodiment specifically introduces a process of sequentially executing text vocabularies by setting a buffer area on the basis of the previous embodiments.

In an embodiment, vectorized data such as the initial text sequence, the initial text feature, the structured text sequence, the structured feature, the target text feature, the target text sequence and the like may be stored and sequentially processed by setting multiple buffer areas. That is, the method further includes:

storing the extracted initial text features in an initial buffer area;

storing the extracted structured features in a factual buffer;

correspondingly, fusing and generating the target text sequence based on the initial text feature and the structured feature includes:

fusing and generating the target text sequence based on an initial text feature to be currently processed that sequentially extracted from the initial buffer area and the structured feature from the factual buffer area.

Specifically, three buffer areas can be set corresponding to FIG. 2B or 2C:

the initial buffer area: used to store the initial text sequence and initial text feature $b_t$; in the initial buffer area, the initial text sequence is calculated by a bi-directional long short-term memory recurrent neural network to obtain the initial text feature;

the factual buffer area: used to store a triple representing facts: <subject, predicate, object>, that is, the structured text sequence, and store the corresponding structured feature $t_j$, $1 \leq j \leq M$; in the factual buffer area, after a vector presentation of the factual triplet is obtained by splicing the vector representations of the subject, predicate and object, the structured feature is obtained through a fully connected neural network;

an editing buffer area: used to store editing data streams, that is, store the target text sequence and the target text feature $s_t$. In the editing buffer area, for the initial target text feature, after adding an average of all vectors in the initial buffer area with the average of all vectors in the factual buffer area, the initial target text feature can be obtained through another fully connected neural network. Then the text features of each moment thereafter are obtained by calculating through the long short-term memory recurrent neural network.

In the process of model calculation, the current initial text feature can be sequentially extracted from the initial buffer area, and a current factual vector $\tilde{t}_t$ can be extracted from the factual buffer area, and a current initial text feature vector $b_t$ and the current factual vector $\tilde{t}_t$ is matched, that is, comparing the current initial text feature vector $b_t$ with the current factual vector $\tilde{t}_t$ for substantial feature content. An execution action is obtained based on a result of comparing the substantial content; and the target text feature after a text processing based on the execution action is then stored in the editing buffer area.

The following describes processing processes of the three execution actions based on the buffer area in combination with the accompanying drawings:

1) Reserving, also known as copy: which is to send the current initial text feature $b_t$ in the initial buffer area and the current factual vector $\tilde{t}_t$ into the long short-term memory recurrent neural network corresponding to the editing data stream, and calculate a new current target text feature $s_t$, and move a scan pointer of the initial buffer area back once to prepare to start processing of the next initial text feature.

Figure 4A:
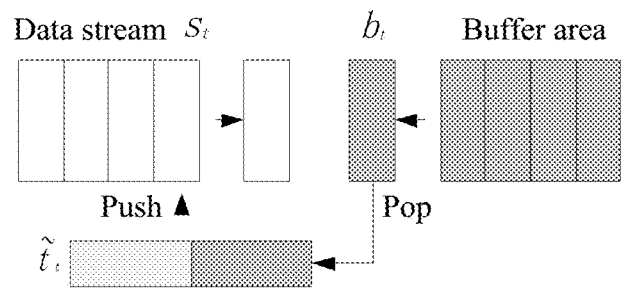
FIG. 4A is a schematic diagram of a text sequence generating method provided by one or more embodiments of the present disclosure.

As shown in FIG. 4A, the initial text feature is cached in an initial buffer area, the current initial text feature vector $b_t$ is extracted from the initial text feature, and the current factual vector $\tilde{t}_t$ is extracted from the structured feature, the current initial text feature vector $b_t$ is compared with the current factual vector $\tilde{t}_t$ for substantial feature content, where the current initial text feature vector $b_t$ is consistent with the substantial feature content of the current factual vector $\tilde{t}_t$, it is determined that the execution action actually executes information reserving, and the current initial text feature vector $b_t$ is copied into the current target text feature $s_t$.

Figure 4B:
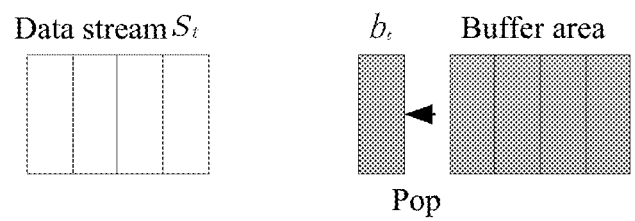
FIG. 4B is a schematic diagram of a text sequence generating method provided by one or more embodiments of the present disclosure.

2) Discarding, also known as deletion: as shown in FIG. 4B, the initial text feature is cached in the initial buffer area, the current initial text feature vector $b_t$ is extracted from the initial text feature, and the current factual vector $\tilde{t}_t$ is extracted from the structured feature, and it is found out that the current factual vector $\tilde{t}_t$ does not exist, that is, there is no structured feature associated with the initial text feature, and there is no comparing result, it is determined that the execution action actually executes information discarding, the current initial text feature vector $b_t$ is skipped for the next moment, the current initial text feature vector $b_{t+1}$ is extracted from the initial text feature, and the above operations are repeated. The current target text features of the edit data stream remain unchanged.

Figure 4C:
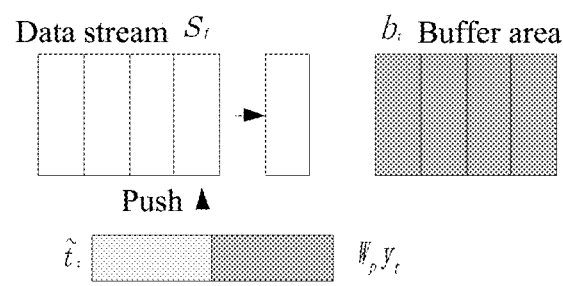
FIG. 4C is a schematic diagram of a text sequence generating method provided by one or more embodiments of the present disclosure.

3) Generating, as shown in FIG. 4C, the initial text feature is cached in the buffer area, the current initial text feature vector $b_t$ is extracted from the initial text feature, and the current factual vector $\tilde{t}_t$ is extracted from the structured feature, the current initial text feature vector $b_t$ is compared with the current factual vector $\tilde{t}_t$ for substantial feature content, where the current initial text feature vector $b_t$ is inconsistent with the substantial feature content of the current factual vector $\tilde{t}_t$, it is determined that the execution action actually executes information splicing and generating, and calculation needs to be performed, and the newly generated vocabulary is spliced with the current factual vector $\tilde{t}_t$, and then a value is assigned to the current target text feature $s_t$.

In the above text sequence generating method, the initial text feature and the structured text sequence are extracted from the initial text sequence and the structured text sequence based on a plurality of neural networks, and the initial text feature and the structured text sequence is matched to obtain the execution action, and the target text sequence is generated based on the execution action, which solves a problem of factual errors or omissions in a text-to-text conversion technology and a problem of the text obtained by a table-to-text conversion technology is blunt and unsmooth, thus improves an accuracy and fluency of text editing.

Figure 5:
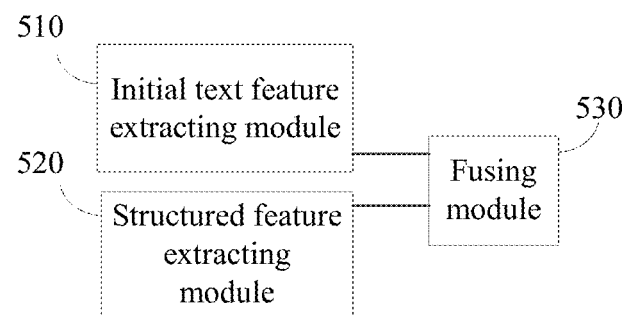
FIG. 5 is a schematic structural diagram of a text sequence generating apparatus provided by one or more embodiments of the present disclosure.

FIG. 5 is a schematic structural diagram of a text sequence generating apparatus provided by one or more embodiments of the present disclosure. The apparatus includes: an initial text feature extracting module 510, a structured feature extracting module 520 and a fusing module 530.

Among them, the initial text feature extracting module 510 is configured to extract an initial text feature of an initial text sequence; the structured feature extracting module 520 is configured to extract a structured features of a structured text sequence; and the fusing module 503 is configured to fuse and generate a target text sequence based on the initial text feature and structured feature.

The embodiment of the present disclosure uses a text sequence generating scheme that combines the text sequences and structured text sequences, the fluency of the generated target text sequence is improved through the text sequence, and the factual accuracy of the target text sequence is improved through the structured text sequences, which solves the problem of factual errors or omissions in a text-to-text conversion technology, and the technical problems such as the text obtained by the structured data-to-text conversion technology is blunt and unsmooth, and improves the accuracy and fluency of text editing.

In an embodiment, the initial text feature extracting module 510 includes a feature extracting unit;

the feature extracting unit is configured to obtain the initial text sequence, and input the initial text sequence into a bi-directional long short-term memory recurrent neural network to extract the initial text feature.

Furthermore, the structured feature extracting module 520 includes a factual triplet determining unit;

the factual triplet determining unit is configured to determine at least one factual triplet based on the structured text sequence, where the factual triplet includes a subject, a predicate and an object; and input the factual triplet into a fully connected neural network to splice and form a factual triplets sequence as the structured feature.

Furthermore, the fusing module 530 includes a filtering unit and a correcting unit;

the filtering unit is configured to filter the initial text features based on the structured features, to fuse and generate the target text sequence;

the correcting unit is configured to correct text content of the initial text feature based on the structured feature, to fuse and generate the target text sequence;

further, the filtering unit and the correcting unit include a current subunit, an execution action determining unit and a target sequence generating unit;

the current subunit is configured to take each initial text feature as a current initial text feature respectively;

the execution action determining unit is configured to perform a factual matching between the current initial text feature and the structured feature, and determine an execution action for the current initial text feature based on a factual matching result; and the target sequence generating unit is configured to process the current initial text feature based on the execution action to generate the target text sequence.

Furthermore, the execution action determining unit is specifically configured to determine that the execution action is reserving, when there is a structured feature that matches the current initial text feature, and the current initial text feature matches text content of the matched structured feature;

determine that the execution action is splicing and generating, when there is a structured feature that matches the current initial text feature, and the current initial text feature is inconsistent with text content of the matched structured feature;

determine that the execution action is discarding, when there is no structured feature matching the current initial text feature;

alternatively, input the current initial text feature and the structured feature into a long short-term memory recurrent neural network for the factual matching, and determine the execution action for the current initial text feature based on the factual matching result.

Furthermore, the target sequence generating unit is specifically configured to reserve the current initial text feature as the target text feature, when the execution action is reserving; splice and generate the target text features based on the current initial text feature and matched structured features, when the execution action is splicing and generating; filter and discard the current initial text feature, when the execution action is discarding; and generate the target text sequence based on the target text feature.

In an embodiment, the execution action determining unit is specifically configured to calculate the current factual vector $\tilde{t}_t$ based on the following formula:

$$\tilde{t}_t = \sum_{j=1}^{M} \alpha_{t,j} t_j$$

in which, $\alpha_{t,j}$ is determined based on the following formula:

$$\alpha_{t,j} \propto \exp(v_\alpha^T \cdot \tanh(W_\alpha \cdot [s_t; b_t; t_j]))$$

in which, $W_\alpha$ and $v_\alpha^T$ are parameters to be trained; $b_t$ is the current initial text feature; $s_t$ is the current target text feature; a subscript t is a serial number of the text feature; $t_j$ is the structured feature, $1 \leq j \leq M$, and M is a number of the structured features; exp( ) is an exponential function, and tanh( ) is a hyperbolic tangent function;

in which, $t_j$ is determined based on the following formula:

$$t_j = \tanh(W_t \cdot [e_j^{rabj}; e_j^{pred}; e_j^{abj}] + \alpha_t)$$

in which, $W_t$ and $\alpha_t$ are parameters to be trained; $e_j^{rabj}$, $e_j^{pred}$ and $e_j^{abj}$ are semantic vocabulary vectors of the subject, predicate and object of the structured feature; where [;] represents a connection of the vector;

input $b_t$, $s_t$ and $t_t$ into a fully connected neural network to obtain an action selection judging vector $z_t$ based on the following formula:

$$z_t = \tanh(W_z \cdot [s_t; b_t; \tilde{t}_t] + \alpha_z)$$

in which, $W_z$ and $\alpha_z$ are parameters to be trained.

determine, based on a multiplication result of the action selection judging vector $z_t$ and the action selecting parameter $W_a$, an action determining probability p(action|$z_t$) of the action performed on the current initial text feature; and determine the execution action of the current initial text sequence based on the action determining probability.

Furthermore, the target sequence generating unit includes a splicing and generating subunit;

the splicing and generating subunit is configured to take a vocabulary in a vocabulary base and a vocabulary in the structured text sequence as a candidate vocabulary, calculate a generating probability of each candidate vocabulary being a new vocabulary, and determine a new vocabulary based on the generating probability; and map the new vocabulary to generate a sequence vector, and splicing it with the current factual vector $\bar{t}_t$ to generate the target text feature.

Furthermore, the splicing and generating subunit is specifically configured to calculate a source probability $p_{gate}$ that a source of the new vocabulary is the vocabulary base or structured text sequence based on the following formula:

$$p_{gate}=\text{sigmoid}(\omega_g^T \cdot z_t + a_g)$$

in which, $\omega_g^T$ and $a_g$ are the parameters to be trained; sigmoid( ) is an activation function;

calculate a generating probability $p_{gen}(y_t|z_t)$ of the candidate vocabulary in the vocabulary base based on the following formula:

$$p_{gen}(y_t|z_t)=\text{softmax}(W_y \cdot z_t)$$

in which, $W_y$ is a parameter to be trained, $y_t$ is a new vocabulary to be generated; softmax( ) is a cost function of a regression algorithm;

calculate a copy probability $p_{copy}$ of the candidate vocabulary in the structured text sequence based on the following formula:

$$p_{copy}=(o_j|z_t) \propto \exp(v_c \cdot \tanh(W_c \cdot [z_t; t_j]))$$

in which, $v_c$ and $W_c$ are parameters to be trained, and $o_j$ is a factual triplet of the candidate vocabulary;

calculate, based on the source probability, the generating probability and the copy probability, the generating probability of the new vocabulary as:

$$p_{(y_t|z_t)} = p_{gate} p_{gen}(y_t|z_t) + (1-p_{gate}) \sum_{j=1:o_j=y_t}^{M} p_{copy}(o_j|z_t)$$

determine the new vocabulary from each candidate vocabulary based on the generating probability.

Furthermore, the apparatus further includes at least one buffer area for storing the extracted initial text features in an initial buffer area; and for storing the extracted structured features in a factual buffer area; correspondingly, the fusing and generating the target text sequence based on the initial text feature and the structured feature includes: fusing and generating the target text sequence based on an initial text feature to be currently processed that sequentially extracted from the initial buffer area and the structured feature from the factual buffer area.

Furthermore, the apparatus also includes a feature splicing module;

the feature splicing module is configured to input the initial text feature and the structured feature into a fully connected neural network for feature splicing.

The text sequence generating apparatus provided in the above embodiments can execute the text sequence generating method provided by any embodiment of the present application, and has corresponding functional modules for executing the method as well as beneficial effects.

Figure 6:
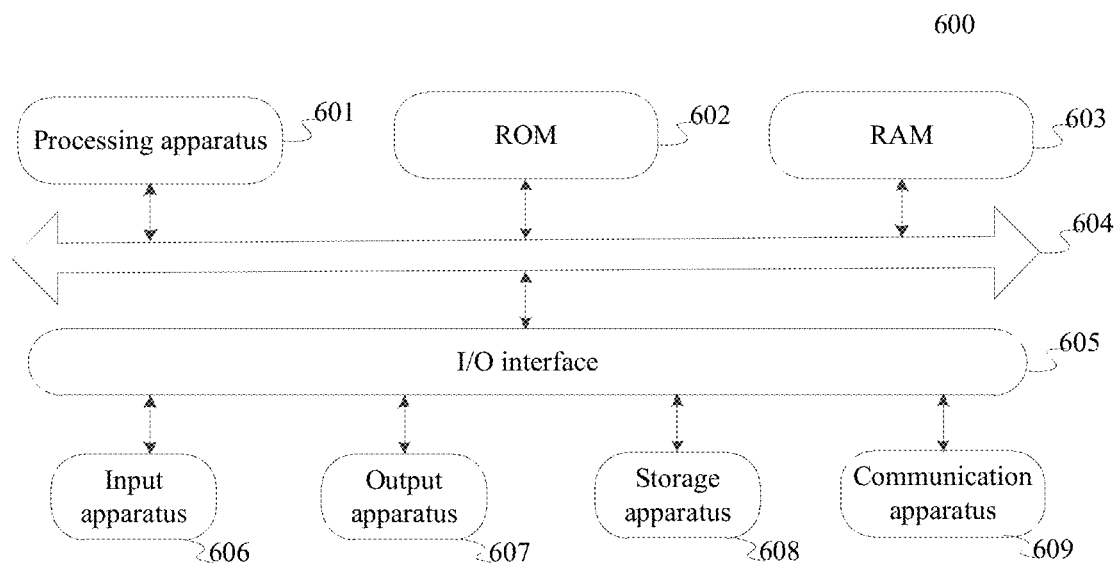
FIG. 6 is a schematic structural diagram of an electronic device provided by one or more embodiments of the present disclosure.

Referring to FIG. 6, which shows a schematic structural diagram of an electronic device 600 suitable for implementing embodiments of the present disclosure.

As shown in FIG. 6, the electronic device 600 may include a processing apparatus (such as, a central processing unit, a graphics processor and the like) 601, it can execute various appropriate actions and processes based on programs stored in a read-only memory (RAM) 603 or programs load into a random access memory (RAM) 603 from a storage device 606. In the RAM 603, various programs and data necessary for the operation of the electronic device 600 are also stored. The processing apparatus 601, ROM 602 and RAM 603 are connected to each other through a bus 604. An input/output (I/O) interface 605 is also connected to the bus 604.

Typically, the following apparatus may be connected to the I/O interface 605: input apparatus 606 includes, for example, a touch screen, touchpad, keyboard, mouse, camera, microphone, accelerometer, gyroscope and the like; an output apparatus 607 includes, for example, a liquid crystal display (LCD), speaker, vibration and the like; a storage apparatus 606 includes, for example, a magnetic tape, hard disk and like; and a communication apparatus 609. The communication apparatus 609 may allow the electronic device 600 to communicate wirelessly or by wire with other devices to exchange data. While FIG. 6 shows the electronic device 600 with various apparatus, it should be understood that not all of the illustrated apparatus are required to be implemented or provided. More or fewer apparatus may alternatively be implemented or provided.

In particular, according to embodiments of the present disclosure, the processes described above with reference to the flowcharts may be implemented as computer software programs. For example, embodiments of the present disclosure include a computer program product including a computer program carried on a non-transitory computer readable medium, the computer program containing program codes for performing the method illustrated in the flowchart. In such an embodiment, the computer program may be downloaded and installed from the network via the communication apparatus 609, or from the storage apparatus 606, or from the ROM 602. When the computer program is executed by the processing apparatus 601, steps in the method of the embodiment of the present disclosure are executed to realize the above-mentioned functions defined by the computer program.

Embodiments of the present disclosure also provide a computer program product, the computer program product includes: a computer program, where the computer program is stored in a readable storage medium, from which one or more processors of an electronic device can read the computer program, and the one or more processors execute the computer program, enables the electronic device to execute a solution provided by any of the above-mentioned embodiments.

Embodiments of the present disclosure also provide a computer program, where the computer program is stored in a readable storage medium, from which one or more processors of the electronic device can read the computer program, and the one or more processors execute the computer program, enables the electronic device to execute the solution provided by any of the above-mentioned embodiments It should be noted that, the computer-readable medium mentioned above in the present disclosure may be a computer-readable signal medium or a computer-readable storage medium, or any combination of the above two. The computer-readable storage medium can be, but not limited to, for example, an electrical, magnetic, optical, electromagnetic, infrared or semiconductor system, apparatus or device, or a combination of any of the above. More specific examples of the computer readable storage media may include, but are not limited to, electrical connections with one or more wires, portable computer disks, hard disks, random access memories (RAM), read-only memories (ROM), erasable programmable read only memories (EPROM or flash memory), optical fibers, portable compact disk read-only memories (CD-ROM), optical storage devices, magnetic storage devices or any suitable combination of the above. In the present disclosure, the computer-readable storage medium may be any tangible medium that contains or stores the program, and the program can be used by or in conjunction with an instruction execution system, apparatus or device. In the present disclosure, the computer-readable signal medium may include a data signal propagated in baseband or as part of a carrier wave, and carries computer-readable program code thereto. The propagated data signals may take a variety of forms, including but not limited to electromagnetic signals, optical signals or any suitable combination of the foregoing. The computer-readable signal medium can also be any computer-readable medium other than the computer-readable storage medium, the computer-readable signal medium can transmit, propagate or transport the program for use by or in conjunction with the instruction execution system, apparatus or device. Program codes embodied on the computer readable medium may be transmitted by any suitable medium, which includes, but not limited to, electrical wire, optical fiber cable, radio frequency (RF) and the like, or any suitable combination of the foregoing.

In some embodiments, a client and server can use any currently known or future developed network protocol such as Hyper Text Transfer Protocol (HTTP) to communicate, and can be interconnected with any form or medium of digital data communication (such as, a communication network). Examples of the communication network include the local area networks ("LAN"), wide area networks ("WAN"), the Internet network (such as, the Internet), and peer-to-peer networks (such as, ad hoc peer-to-peer networks), as well as any currently known or future developed networks.

The computer-readable medium may be included in the electronic device; or may exist alone without being assembled into the electronic device.

The computer-readable medium carries one or more programs, and when the one or more programs are executed by the electronic device, enables the electronic device to: acquire at least two Internet Protocol addresses; send a node evaluating request including the at least two Internet Protocol addresses to a node evaluating device, where the node evaluating device selects the Internet Protocol address from the at least two Internet Protocol addresses and returns it; receives the Internet Protocol address returned by the node evaluating device; where the obtained Internet Protocol address indicates an edge node in a content distribution network.

Alternatively, the computer-readable medium carries one or more programs, and when the one or more programs are executed by the electronic device, enables the electronic device to: receives a node evaluating request including at least two Internet Protocol addresses; select the Internet Protocol address from the at least two Internet Protocol addresses; return the selected Internet Protocol address; where the received Internet Protocol address indicates the edge node in the content distribution network.

Computer program codes for performing operations of the present disclosure may be written in one or more programming languages or a combination of thereto, the programming language includes but not limited to object-oriented programming languages, such as Java, Smalltalk, C++, and also includes conventional procedural programming languages, such as the "C" language or similar programming languages. The program code may execute entirely on a user's computer, partly on the user's computer, as a stand-alone software package, partly on the user's computer and partly on a remote computer, or entirely on the remote computer or server. In a case involving the remote computer, the remote computer may be connected to the user's computer through any kind of network, including the local area network (LAN) or wide area network (WAN), or may be connected to an external computer (such as, connecting through the Internet using an Internet service provider).

Flowcharts and block diagrams in accompanying drawings illustrate possible architectures, functionalities, and operations of apparatus, methods and computer program products according to various embodiments of the present disclosure. In this point, each block in the flowchart or block diagram may represent a module, program segment or portion of code, and the module, program segment or portion of code contains one or more executable instructions for implementing the specified logical function. It should also be noted that, in some alternative implementations, the functions noted in the blocks may occur out of an order noted in the figures. For example, two blocks shown in succession may, in fact, be executed substantially concurrently, or may sometimes be executed in the reverse order, which is depended upon the functionality involved. It is also noted that each block in the block diagrams and/or flowchart, and combinations of blocks in the block diagrams and/or flowchart, can be implemented in dedicated hardware-based systems that perform specified functions or operations, or can be implemented in a combination of dedicated hardware and computer instructions.

Units involved in the embodiments of the present disclosure may be implemented in a software manner, and may also be implemented in a hardware manner. In which, a name of the unit does not constitute a limitation of the unit itself under certain circumstances, for example, the first obtaining unit may also be described as "a unit that obtains at least two Internet Protocol addresses".

The functions described herein above may be performed, at least in part, by one or more hardware logic components. For example, without limitation, exemplary types of hardware logic components that may be used include: the Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and the like.

In the context of the present disclosure, a machine-readable medium may be a tangible medium that may contain or store a program for use by or in conjunction with the instruction executable system, apparatus or device. The machine-readable medium may be a machine-readable signal medium or a machine-readable storage medium. The machine-readable media may include, but are not limited to, electronic, magnetic, optical, electromagnetic, infrared or semiconductor systems, apparatus or devices, or any suitable combination of the foregoing. More specific examples of the machine-readable storage media would include one or more wires-based electrical connections, portable computer disks, hard disks, random access memory (RAM), read-only memory (ROM), erasable programmable read-only memory (EPROM or flash memory), fiber optics, compact disk read-only memory (CD-ROM), optical storage devices, magnetic storage devices, or any suitable combination of the foregoing.

According to one or more embodiments of the present disclosure, a text sequence generating method is provided, the method includes:

obtaining an initial text sequence, and extracting an initial text feature from the initial text sequence;

obtaining a structured text sequence, and extracting a structured feature from the structured text sequence; where the structured text sequence is associated with a fact in the initial text sequence;

fusing and generating a target text sequence based on the initial text feature and the structured feature.

According to one or more embodiments of the present disclosure, in the above-mentioned method, the fusing and generating the target text sequence based on the initial text feature and the structured feature includes:

filtering the initial text feature based on the structured feature and correcting text content of the initial text feature based on the structured feature, to fuse and generate the target text sequence.

According to one or more embodiments of the present disclosure, in the above-mentioned method, the filtering the initial text feature based on the structured feature and correcting text content of the initial text feature based on the structured feature, to fuse and generate the target text sequence includes:

taking each initial text feature as a current initial text feature respectively;

performing factual matching between the current initial text feature and the structured feature, and determining an execution action for the current initial text feature based on a factual matching result; and processing the current initial text feature based on the execution action to generate the target text sequence.

According to one or more embodiments of the present disclosure, in the above-mentioned method, the determining the execution action for the current initial text feature based on the factual matching result includes:

determining that the execution action is reserving, when there is the structured feature that matches the current initial text feature, and the current initial text feature matches text content of the matched structured feature;

determining that the execution action is splicing and generating, when there is a structured feature that matches the current initial text feature, and the current initial text feature is inconsistent with text content of the matched structured feature;

determining that the execution action is discarding, when there is no structured feature matching the current initial text feature;

correspondingly, the processing the current initial text feature based on the execution action to generate the target text sequence includes:

reserving the current initial text feature as the target text feature, when the execution action is reserving;

splicing and generating the target text feature based on the current initial text feature and the matched structured feature, when the execution action is splicing and generating;

filtering and discarding the current initial text feature, when the execution action is discarding; and generating the target text sequence based on the target text feature.

According to one or more embodiments of the present disclosure, in the above-mentioned method, the performing the factual matching between the current initial text feature and the structured feature, and determining the execution action for the current initial text feature based on the factual matching result includes:

inputting the current initial text feature and the structured feature into a long short-term memory recurrent neural network for the factual matching, and determining the execution action for the current initial text feature based on the factual matching result.

According to one or more embodiments of the present disclosure, in the above-mentioned method, the obtaining the initial text sequence, and extracting the initial text feature from the initial text sequence includes:

obtaining the initial text sequence, and inputting the initial text sequence into a bi-directional long short-term memory recurrent neural network to extract the initial text feature.

According to one or more embodiments of the present disclosure, in the above-mentioned method, the obtaining the structured text sequence, and extracting the structured feature from the structured text sequence includes:

determining at least one factual triplet based on the structured text sequence, where the factual triplet includes a subject, a predicate and an object;

inputting the factual triplet into a fully connected neural network to splice and form a factual triplet sequence as the structured features.

According to one or more embodiments of the present disclosure, in the above-mentioned method, the performing the factual matching between the current initial text feature between the structured feature, and determining the execution action for the current initial text feature based on the factual matching result includes:

calculating a current factual vector $\tilde{t}_t$ based on the following formula:

$$\tilde{t}_t = \sum_{j=1}^{M} \alpha_{t,j} t_j$$

where, $\alpha_{t,j}$ is determined based on the following formula:

$$\alpha_{t,j} \propto \exp(v_\alpha^T \cdot \tanh(W_\alpha \cdot [s_t; b_t; t_j]))$$

where, $W_\alpha$ and $v_\alpha^T$ are parameters to be trained; $b_t$ is the current initial text feature; $s_t$ is a current target text feature; a subscript t is a serial number of the text feature; $t_j$ is the structured feature, $1 \leq j \leq M$, and M is a number of the structured features; exp( ) is an exponential function, and tanh( ) is a hyperbolic tangent function;

where, $t_j$ is determined based on the following formula:

$$t_j = \tanh(W_t \cdot [e_j^{rabj}; e_j^{pred}; e_j^{abj}] + \alpha_t)$$

where, $W_t$ and $\alpha_t$ are parameters to be trained; $e_j^{rabj}$, $e_j^{pred}$ and $e_j^{abj}$ are semantic vocabulary vectors of the subject, predicate and object of the structured feature; where [;] represents a connection of the vector;

input $b_t$, $s_t$ and $t_t$ into a fully connected neural network to obtain an action selection judging vector $z_t$ based on the following formula:

$$z_t = \tanh(W_z \cdot [s_t; b_t; \tilde{t}_t] + \alpha_z)$$

where, $W_z$ and $\alpha_z$ are the parameters to be trained;

determining, based on a multiplication result of the action selection judging vector $z_t$ and the action selecting parameter $W_a$, an action determining probability p(action|$z_t$) of an action performed on the current initial text feature; and determining the execution action of the current initial text sequence based on the action determining probability.

According to one or more embodiments of the present disclosure, in the above-mentioned method, the splicing and generating the target text feature based on the current initial text feature and the matched structured feature includes:

taking a vocabulary in a vocabulary base and a vocabulary in the structured text sequence as a candidate vocabulary, calculating a generating probability of each candidate vocabulary being a new vocabulary, and determining the new vocabulary based on the generating probability; and mapping the new vocabulary to generate a sequence vector, and splicing the sequence vector with a current factual vector $t_t$ to generate the target text feature.

According to one or more embodiments of the present disclosure, in the above-mentioned method, the taking the vocabulary in the vocabulary base and the vocabulary in the structured text sequence as the candidate vocabulary, calculating the generating probability of each candidate vocabulary being the new vocabulary, and determining the new vocabulary based on the generating probability includes:

calculating a source probability $p_{gate}$ that a source of the new vocabulary is the vocabulary base or the structured text sequence based on the following formula:

$$p_{gate} = \text{sigmoid}(\omega_g^T \cdot z_t + a_g)$$

where, $\omega_g^T$ and $a_g$ are parameters to be trained; sigmoid( ) is an activation function;

calculating a generating probability $p_{gen}(y_t|z_t)$ of the candidate vocabulary in the vocabulary base based on the following formula:

$$p_{gen}(y_t|z_t) = \text{softmax}(W_y \cdot z_t)$$

where, $W_y$ is a parameter to be trained, $y_t$ is a new vocabulary to be generated; softmax( ) is a cost function of a regression algorithm;

calculating a copy probability $p_{copy}$ of the candidate vocabulary in the structured text sequence based on the following formula:

$$p_{copy} = (o_j|z_t) \propto \exp(v_c \cdot \tanh(W_c \cdot [z_t; t_j]))$$

where, $v_c$ and $W_c$ are parameters to be trained, and $o_j$ is a factual triplet of the candidate vocabulary;

calculating, based on the source probability, the generating probability and the copy probability, the generating probability of the new vocabulary as:

$$p_{(y_t|z_t)} = p_{gate} p_{gen}(y_t|z_t) + (1 - p_{gate}) \sum_{j=1: o_j = y_t}^{M} p_{copy}(o_j|z_t)$$

determining the new vocabulary from each candidate vocabulary based on the generating probability.

According to one or more embodiments of the present disclosure, further including:

storing the extracted initial text features into an initial buffer area;

storing the extracted structured features into a factual buffer area;

correspondingly, the fusing and generating the target text sequence based on the initial text feature and the structured feature includes:

fusing and generating the target text sequence based on an initial text feature to be currently processed that sequentially extracted from the initial buffer area and the structured feature from the factual buffer area.

According to one or more embodiments of the present disclosure, in the above-mentioned method, before the fusing to generate the target text sequence based on the initial text feature and the structured feature, the method further includes:

inputting the initial text feature and the structured feature into a fully connected neural network for a feature splicing.

According to one or more embodiments of the present disclosure, a text sequence generating apparatus is provided, the apparatus includes:

an initial text feature extracting module, configured to extract an initial text feature of an initial text sequence;

a structured feature extracting module, configured to extract a structured feature of a structured text sequence; and a fusing module, configured to fuse and generate a target text sequence based on the initial text feature and the structured feature.

According to one or more embodiments of the present disclosure, an electronic device involved in the above-mention method includes:

one or more processors;

a memory for storing one or more programs;

when the one or more programs are executed by the one or more processors, enables the one or more processors to implement the text sequence generating method according to any one of the embodiment of the present disclosure.

According to one or more embodiments of the present disclosure, a non-transitory computer-readable storage medium is provided in the above-mention method, on which a computer program is stored, where the computer program implements the text sequence generating method according to any one of the embodiment of the present disclosure when executed by a processor.

The above description is merely a preferred embodiment of the present disclosure and an illustration of technical principles employed. Those skilled in the art should understand that a disclosure scope involved in the present disclosure is not limited to technical solutions formed by a specific combination of the above-mentioned technical features, and should also cover other technical solutions formed by any combination of the above technical features or their equivalents without departing from the above disclosed concept, such as a technical solution that formed by replacing the above technical features with the technical features disclosed in the present disclosure (but not limited to) with similar functions.

Additionally, although operations are described in a particular order, this should not be construed as requiring that the operations be performed in the shown particular order or executed in a sequential order. Under certain circumstances, multitasking and parallel processing may be advantageous. Likewise, although several specific implementations are contained in the above discussion, these should not be construed as limitations on the scope of the present disclosure. Certain features that are described in the context of separate embodiments can also be implemented in combination in a single embodiment. Conversely, various features that are described in the context of the single embodiment can also be implemented in multiple embodiments separately or in any suitable subcombination.

Although a subject matter has been described in language specific to structured features and/or logical acts of method, it is to be understood that the subject matter defined in the appended claims is not necessarily limited to specific features or actions described above. Rather, the specific features and actions described above are merely example forms of implementing the claims.

What is claimed is:

1. A text sequence generating method, comprising:
obtaining an initial text sequence, and extracting an initial text feature from the initial text sequence;
obtaining a structured text sequence, and extracting a structured feature from the structured text sequence, wherein the structured text sequence is associated with a fact in the initial text sequence; and
fusing and generating a target text sequence based on the initial text feature and the structured feature, wherein the fusing and generating the target text sequence based on the initial text feature and the structured feature comprises:
filtering the initial text feature based on the structured feature and correcting text content of the initial text feature based on the structured feature, to fuse and generate the target text sequence, wherein the filtering the initial text feature based on the structured feature and correcting text content of the initial text feature based on the structured feature, to fuse and generate the target text sequence comprises:
taking each initial text feature as a current initial text feature respectively;
performing a factual matching between the current initial text feature and the structured feature, and determining an execution action for the current initial text feature based on a factual matching result; and
processing the current initial text feature based on the execution action to generate the target text sequence.

2. The method according to claim 1, wherein the determining the execution action for the current initial text feature based on the factual matching result comprises:
determining that the execution action is reserving, when there is a structured feature that matches the current initial text feature, and the current initial text feature matches text content of the matched structured feature;
determining that the execution action is splicing and generating, when there is a structured feature that matches the current initial text feature, and the current initial text feature is inconsistent with text content of the matched structured feature;
determining that the execution action is discarding, when there is no structured feature matching the current initial text feature;
correspondingly, the processing the current initial text feature based on the execution action to generate the target text sequence comprises:
reserving the current initial text feature as the target text feature, when the execution action is reserving;
splicing and generating the target text feature based on the current initial text feature and the matched structured feature, when the execution action is splicing and generating;
filtering and discarding the current initial text feature, when the execution action is discarding; and
generating the target text sequence based on the target text feature.

3. The method according to claim 2, wherein the splicing and generating the target text feature based on the current initial text feature and the matched structured feature comprises:
taking a vocabulary in a vocabulary base and a vocabulary in the structured text sequence as a candidate vocabulary, calculating a generating probability of each candidate vocabulary being a new vocabulary, and determining the new vocabulary based on the generating probability; and
mapping the new vocabulary to generate a sequence vector, and splicing the sequence vector with a current factual vector $t_t$ to generate the target text feature.

4. The method according to claim 3, wherein the taking the vocabulary in the vocabulary base and the vocabulary in the structured text sequence as the candidate vocabulary, calculating the generating probability of each candidate vocabulary being the new vocabulary, and determining the new vocabulary based on the generating probability comprises:
calculating a source probability $p_{gate}$ that a source of the new vocabulary is the vocabulary base or the structured text sequence based on the following formula:

$$p_{gate} = \text{sigmoid}(\omega_g^T \cdot z_t + a_g)$$

wherein, $\omega_g^T$ and $a_g$ are parameters to be trained; sigmoid( ) is an activation function;
calculating a generating probability $p_{gen}(y_t|z_t)$ of the candidate vocabulary in the vocabulary base based on the following formula:

$$p_{gen}(y_t|z_t) = \text{softmax}(W_y \cdot z_t)$$

wherein, $W_y$ is a parameter to be trained, $y_t$ is a new vocabulary to be generated; softmax( ) is a cost function of a regression algorithm;
calculating a copy probability $p_{copy}$ of the candidate vocabulary in the structured text sequence based on the following formula:

$$p_{copy} = (o_j|z_t) \propto \exp(v_c \tanh(W_c \cdot [z_t; t_j]))$$

wherein, $v_c$ and $W_c$ are parameters to be trained, and $o_j$ is a factual triplet of the candidate vocabulary;
calculating, based on the source probability, the generating probability and the copy probability, the generating probability of the new vocabulary as:

$$p(y_t|z_t) = p_{gate} p_{gen}(y_t|z_t) + (1 - p_{gate}) \sum_{j=1: o_j = y_t}^{M} p_{copy}(o_j|z_t)$$

determining the new vocabulary from each candidate vocabulary based on the generating probability.

5. The method according to claim 1, wherein the performing the factual matching between the current initial text feature and the structured feature, and determining the execution action for the current initial text feature based on the factual matching result comprises:
inputting the current initial text feature and the structured feature into a long short-term memory recurrent neural network for the factual matching, and determining the execution action for the current initial text feature based on the factual matching result.

6. The method according to claim 1, wherein the obtaining the initial text sequence and extracting the initial text feature from the initial text sequence comprises:
obtaining the initial text sequence, and inputting the initial text sequence into a bi-directional long short-term memory recurrent neural network to extract the initial text feature.

7. The method according to claim 1, wherein the obtaining the structured text sequence and extracting the structured feature from the structured text sequence comprises:
determining at least one factual triplet based on the structured text sequence, wherein the factual triplet comprises a subject, a predicate and an object; and
inputting the factual triplet into a fully connected neural network to splice and form a factual triplet sequence as the structured feature.

8. The method according to claim 1, wherein the performing the factual matching between the current initial text feature between the structured feature, and determining the execution action for the current initial text feature based on the factual matching result comprises:

calculating a current factual vector $\tilde{t}_t$ based on the following formula:

$$\tilde{t}_t = \sum_{j=1}^{M} \alpha_{t,j} t_j$$

wherein, $\alpha_{t,j}$ is determined based on the following formula:

$$\alpha_{t,j} \propto \exp(v_\alpha^T \cdot \tanh(W_\alpha \cdot [s_t; b_t; t_j]))$$

wherein, $W_\alpha$ and $v_\alpha^T$, are parameters to be trained; $b_t$ is the current initial text feature; $s_t$ is a current target text feature; a subscript t is a serial number of the text feature; $t_j$ is the structured feature, $1 \leq j \leq M$, and M is a number of the structured features; exp( ) is an exponential function, and tanh( ) is a hyperbolic tangent function;

wherein, $t_j$ is determined based on the following formula:

$$t_j = \tanh(W_t \cdot [e_j^{rabj}; e_j^{pred}; e_j^{abj}] + a_t)$$

wherein, $W_t$ and $a_t$ are parameters to be trained; $e_j^{abi}$, $e_j^{pred}$ and $e_j^{abj}$ are semantic vocabulary vectors of the subject, predicate and object of the structured feature; wherein ; represents a connection of the vector;

inputting $b_t$, $s_t$ and $\tilde{t}_t$ into a fully connected neural network to obtain an action selection judging vector $z_t$ based on the following formula:

$$z_t = \tanh(W_z \cdot [s_t; b_t; \tilde{t}_t] + a_z)$$

wherein, $W_z$ and $a_z$ are parameters to be trained;

determining, based on a multiplication result of the action selection judging vector $z_t$ and the action selecting parameter $W_a$, an action determining probability p(action|$z_t$) of an action performed on the current initial text feature; and determining the execution action of the current initial text sequence based on the action determining probability.

9. The method according to claim 1, further comprising:
storing the extracted initial text features into an initial buffer area;
storing the extracted structured features into a factual buffer area;
correspondingly, the fusing and generating the target text sequence based on the initial text feature and the structured feature comprises:
fusing and generating the target text sequence based on an initial text feature to be currently processed that sequentially extracted from the initial buffer area and the structured feature from the factual buffer area.

10. The method according to claim 9, wherein before the fusing and generating the target text sequence based on the initial text feature and the structured feature, the method further comprises:
inputting the initial text feature and the structured feature into a fully connected neural network for a feature splicing.

11. A text sequence generating apparatus, comprising:
at least one processor; and
a memory communicatively connected with the at least one processor;
the at least one processor executes computer-executable instructions stored in the memory to cause the at least one processor to:
obtain an initial text sequence, and extract an initial text feature from the initial text sequence;
obtain a structured text sequence, and extract a structured feature from the structured text sequence, wherein the structured text sequence is associated with a fact in the initial text sequence; and
fuse and generate a target text sequence based on the initial text feature and the structured feature, wherein the fusing and generating the target text sequence based on the initial text feature and the structured feature comprises:
filtering the initial text feature based on the structured feature and correcting text content of the initial text feature based on the structured feature, to fuse and generate the target text sequence, wherein the filtering the initial text feature based on the structured feature and correcting text content of the initial text feature based on the structured feature, to fuse and generate the target text sequence comprises:
taking each initial text feature as a current initial text feature respectively;
performing a factual matching between the current initial text feature and the structured feature, and determining an execution action for the current initial text feature based on a factual matching result; and
processing the current initial text feature based on the execution action to generate the target text sequence.

12. The apparatus according to claim 11, wherein the at least one processor is further configured to:
determine that the execution action is reserving, when there is a structured feature that matches the current initial text feature, and the current initial text feature matches text content of the matched structured feature;
determine that the execution action is splicing and generating, when there is a structured feature that matches the current initial text feature, and the current initial text feature is inconsistent with text content of the matched structured feature;
determine that the execution action is discarding, when there is no structured feature matching the current initial text feature;
correspondingly, the at least one processor is further configured to:
reserve the current initial text feature as the target text feature, when the execution action is reserving;
splice and generate the target text feature based on the current initial text feature and the matched structured feature, when the execution action is splicing and generating;
filter and discard the current initial text feature, when the execution action is discarding; and
generate the target text sequence based on the target text feature.

13. The apparatus according to claim 11, wherein the at least one processor is further configured to:
input the current initial text feature and the structured feature into a long short-term memory recurrent neural network for the factual matching, and determine the execution action for the current initial text feature based on the factual matching result.

14. The apparatus according to claim 11, wherein the at least one processor is further configured to:
obtain the initial text sequence, and input the initial text sequence into a bi-directional long short-term memory recurrent neural network to extract the initial text feature.

15. The apparatus according to claim 11, wherein the at least one processor is further configured to:
- determine at least one factual triplet based on the structured text sequence, wherein the factual triplet comprises a subject, a predicate and an object; and
- input the factual triplet into a fully connected neural network to splice and form a factual triplet sequence as the structured feature.

16. A non-transitory computer-readable storage medium, on which a computer program is stored, and when a processor executes the computer program, the processor is enabled to:
- obtain an initial text sequence, and extract an initial text feature from the initial text sequence;
- obtain a structured text sequence, and extract a structured feature from the structured text sequence, wherein the structured text sequence is associated with a fact in the initial text sequence; and
- fuse and generate a target text sequence based on the initial text feature and the structured feature, wherein the fusing and generating the target text sequence based on the initial text feature and the structured feature comprises:
- filtering the initial text feature based on the structured feature and correcting text content of the initial text feature based on the structured feature, to fuse and generate the target text sequence, wherein the filtering the initial text feature based on the structured feature and correcting text content of the initial text feature based on the structured feature, to fuse and generate the target text sequence comprises:
  - taking each initial text feature as a current initial text feature respectively;
  - performing a factual matching between the current initial text feature and the structured feature, and determining an execution action for the current initial text feature based on a factual matching result; and
  - processing the current initial text feature based on the execution action to generate the target text sequence.

* * * * *